United States Patent
Lee et al.

(10) Patent No.: US 6,169,262 B1
(45) Date of Patent: Jan. 2, 2001

(54) APPARATUS AND METHOD FOR ENHANCING THE WORKING EFFICIENCY OF AN ELECTRIC DISCHARGING MACHINE

(75) Inventors: Chao Hsiu Lee, Taichung; Yung-Feng Nien, Kao-Hsiung; Jui-Kuan Lin; Hsin Chaun Su, both of Tai-chung, all of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/149,009

(22) Filed: Sep. 8, 1998

(30) Foreign Application Priority Data

Jun. 24, 1998 (TW) .................................................. 87110206

(51) Int. Cl.⁷ ............................... B23H 1/02; B23H 7/20
(52) U.S. Cl. ................................... 219/69.13; 219/69.16; 219/69.18
(58) Field of Search ............................... 219/69.13, 69.16, 219/69.18, 69.19

(56) References Cited

U.S. PATENT DOCUMENTS

| 3,812,317 | * | 5/1974 | De Bont et al. | 219/69.18 |
| 4,892,989 | * | 1/1990 | Itoh | 219/69.13 |
| 5,545,870 | * | 8/1996 | Fujii et al. | 219/69.13 |
| 5,598,075 | * | 1/1997 | Liang et al. | 219/69.16 |

FOREIGN PATENT DOCUMENTS

| 2942549 | * | 4/1981 | (DE) | 219/69.18 |
| 2171822 | * | 9/1986 | (GB) | 219/69.18 |
| 55-48530 | * | 4/1980 | (JP) | 219/69.16 |
| 59-205224 | * | 11 1984 | (JP) | 219/69.16 |
| 59-205225 | * | 11/1984 | (JP) | 219/69.16 |
| 61-146419 | * | 7/1986 | (JP) | 219/69.18 |

* cited by examiner

*Primary Examiner*—Geoffrey S. Evans
(74) *Attorney, Agent, or Firm*—Smith Gambrell & Russell, LLP

(57) ABSTRACT

An apparatus and method is provided for use on an electric discharging machine to enhance the working efficiency of the electric discharging machine. The apparatus and method are directed to the control of the ignition delay time of the ignition voltage used to ignite the electric discharges applied to the workpiece for machining the workpiece. The apparatus and method are directed to the objective of making the duty factor as close to unity as possible. The apparatus and method are characterized in that the average discharge voltage is computed by the CNC (computer numerical control) unit instead of an analog voltage averaging circuit as in the prior art. The average discharge voltage is then used for the determination of the average ignition delay time to accordingly adjust the gain of the servo control loop of the discharging. The electric discharging machine then detects the ignition delay time to accordingly adjust the magnitude of the ignition voltage and the length of the discharge off-time. Moreover, the electric discharging machine is capable of detecting whether the number of consecutive occurrences of arcing reaches a preset number; if yes, the electric discharging machine will perform a residue cleaning process. Moreover, the electric discharging machine is capable of detecting whether a short-circuit occurs; and, if yes, the electric discharging machine will immediately stop the machining process.

14 Claims, 3 Drawing Sheets

APPARATUS AND METHOD FOR ENHANCING THE WORKING EFFICIENCY OF AN ELECTRIC DISCHARGING MACHINE

BACKGROUND OF THE INVENTION

1. Field of the Invention

This invention relates to electric discharging machines, and more particularly, to an apparatus and method for use on an electric discharging machine to enhance the working efficiency of the electric discharging machine.

2. Description of Related Art

FIG. 1 is a schematic block diagram of a conventional electric discharging machine. As shown, the electric discharging machine includes a discharging circuit 1, a discharging feedback control circuit 2, and a CNC (computer numerical control) unit 6. In more detail, the feedback control circuit 2 includes a voltage detector 3, an RC voltage averaging circuit 4, and an ADC (analog-to-digital converter) 5. The voltage detector 3 is coupled to the discharging circuit 1 to detect the voltage drop between the electrode and the workpiece. The output of the voltage detector 3 is then transferred to the RC voltage averaging circuit 4 to be averaged thereby. Then, the output of the RC voltage averaging circuit 4 is transferred to the ADC 5 to be converted into digital form. The digital output from the ADC 5 is then transferred to the CNC unit 6 for the CNC unit 6 to accordingly control the feedrate of the electric discharging machine.

FIG. 2 is a schematic diagram showing the waveform of the voltage drop between the electrode and the workpiece under various conditions. As shown, during the period $T_d$, the voltage $V_i$ is applied to the workpiece; during the period $T_{on}$, the voltage $V_d$ is applied; and during the period $T_{off}$, no voltage is applied; where $V_i$ is ignition voltage;

$V_d$ is discharge voltage;

$T_d$ is ignition delay time;

$T_{on}$ is the on-time of the discharge voltage; and $T_{off}$ is the off-time of the discharge voltage.

The average discharge voltage $V_g$ is then:

$$V_g=(V_i{}^*T_d+V_d{}^*T_{on})/(T_d+T_{on}+T_{off})$$

Fundamentally, the feedrate of the electric discharging machine is related to the average discharge voltage $V_g$. Therefore, the technician can adjust for the desired feedrate by adjusting the average discharge voltage $V_g$.

One drawback to the foregoing servo feedrate control method for the electric discharging machine is that all the discharging parameters, including discharging current, discharging on-time, and discharging off-time, are fixed after being set, making the average discharging voltage also fixed after being set, so that the feedrate will not be adaptively adjustable in response to any variations in the discharging conditions.

Therefore, in the conventional electric discharging machine, the average discharging voltage should be carefully set in advance. As indicated by the foregoing equation, the average discharging voltage $V_g$ is related to the ignition voltage $V_i$, the ignition delay time $T_d$, the discharging voltage $V_d$, the discharging on-time $T_{on}$, and the discharging off-time $T_{off}$. Moreover, the discharging voltage will be varied according to the different materials that make up the electrode and the workpiece. For example, in the case of the combination of copper and steel, the average discharging voltage is within the range from 17 V (volt) to 25 V; and in the case of the combination of graphite and steel, the average discharging voltage is from 20 V to 33 V.

In the RC voltage averaging circuit 4 of FIG. 1, the RC constant is also an important parameter. A large RC constant would allow a short-pulse discharging to be more stable, but may cause the servo response to be more sluggish. Moreover, poor sampling would degrade the working efficiency of the servo control, resulting in an increase in the ignition delay time or in the number of useless discharges.

If the technician adjusts the discharge parameters for some desired results, it would then affect the average discharge voltage. Therefore, a tradeoff exists between the working efficiency of the servo control and the discharge parameters. This makes the working efficiency of the servo control not always optimal.

SUMMARY OF THE INVENTION

It is therefore an objective of the present invention to provide an apparatus and method for use on an electric discharging machine to enhance the working efficiency of the electric discharging machine.

In accordance with the foregoing and other objectives of the present invention, an apparatus and method are provided for use on an electric discharging machine to enhance the working efficiency of the electric discharging machine.

The method of the invention includes the following steps:

(1) detecting the average discharge voltage;

(2) determining the average ignition delay time of the discharges to accordingly adjust the gain of the servo control loop of the discharging;

(3) detecting the ignition delay time to accordingly adjust the magnitude of the ignition voltage and the length of the discharging off-time, (4) detecting whether the number of consecutive occurrences of arcing reaches a preset number; and, if yes, performing a residue cleaning process; and (5) detecting whether a short-circuit occurs; and, if yes, stopping the machining process immediately.

The apparatus of the invention includes the following constituent parts:

a voltage detector for detecting the voltage drop between the workpiece and the electrode;

a discharging waveform comparison circuit, responding to the output of the voltage detector, to check whether the detected voltage by the voltage detector is an ignition voltage;

an ignition delay time computation circuit that, in the event that the discharge waveform comparison circuit determines that the detected voltage by the voltage detector is ignition voltage, detects the length of the ignition delay time of the ignition voltage;

a discharging counter, that responds to the output of the voltage detector, for counting the number of occurrences of discharges; and a CNC unit that in response to the output of the ignition delay time computation circuit and the output of the discharge counter, determines the average ignition delay time obtained from dividing the total time of a series of discharges by the total number of these discharges and accordingly controls the ignition delay time of the subsequent discharges within the average discharge voltage.

The apparatus of the invention further comprises: an ignition delay time detector for detecting whether the ignition delay time is greater than a preset reference value; and, if yes, the ignition delay time detector generates a trigger signal; and a high-voltage ignition circuit, responding to the trigger signal generated by the ignition delay time detector, for applying a high voltage to help the ignition. The apparatus of the invention further comprises: a counter, coupled to the ignition delay time detector, for counting the number of occurrences of discharges for reference by the CNC unit to set the next feedrate.

The apparatus of the invention further comprises: an ignition delay time detector for detecting whether the ignition delay time is less than a preset reference value; and, if yes, the ignition delay time detector generates a trigger signal; and a discharge off-time extending circuit responding to the trigger signal generated by the ignition delay time detector, for extending the discharge off-time.

The apparatus of the invention further comprises: an ignition delay time detector for detecting whether the ignition delay time is less than a preset reference value; and, if yes, the ignition delay time detector generates a trigger signal; and a counter, responding to the trigger signal generated by the ignition delay tine detector, for counting the number of consecutive occurrences of arcing; and, if the ignition delay time detector reaches a preset value, the counter generates an actuating signal to actuate the CNC unit to perform a residue cleaning process.

The apparatus of the invention further comprises: a short-circuit detector, coupled to the output of the voltage detector, for detecting whether the detected voltage by the voltage detector is below a preset short-circuit value; and, if yes, the short-circuit detector generates an actuate signal to actuate the CNC unit to withdraw the workpiece immediately from the working position.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The apparatus and method of the invention is directed to the control of the ignition delay time of the ignition voltage used to ignite the electric discharges with the objective of making the duty factor as close to unity as possible. The apparatus and method is characterized in that the average discharge voltage is computed by the CNC (computer numerical control) unit. The average discharge voltage is then used for the determination of the average ignition delay time of the discharges to accordingly adjust the gain of the servo control loop of the discharging. The electric discharging machine then detects the ignition delay time to accordingly adjust the ignition voltage to a higher level and the discharge off-time to a greater length. Moreover, the electric discharging machine is capable of detecting whether the number of consecutive occurrences of arcing reaches a preset number; and, if yes, performing a residue cleaning process. Still moreover, the electric discharging machine is capable of detecting whether a short-circuit occurs; if yes, stopping the machining process immediately.

The working efficiency of an electric discharging machine is customarily evaluated in terms of three factors: machining rate, surface quality of the machined workpiece, and electrode consumption ratio. This invention is directed mainly to the improvement on the machining rate so the other two factors will not be discussed here in this specification. The machining rate W of an electric discharging machine can be obtained by the following equation:

$$W = 0.0097 * I_p^{1.5} * D$$

where $I_p$ is discharge current; and

D is duty factor, and $D = T_{on}/(T_d + T_{on} + T_{off})$.

It can be learned from the foregoing equation that the machining rate W can be increased by increasing either the discharge current $I_p$ or the duty factor D, or both. However, a change in the discharge current would then adversely affect the surface quality of the machined workpiece and the electrode consumption ratio. Therefore, the adjustment of the duty factor would be a more feasible way to enhance the working efficiency of the electric discharging machine. Among the various parameters of the duty factor, the discharge on-time $T_{on}$ would also affect the surface quality of the machined workpiece and the electrode consumption ratio, but the discharge off-tine $T_{off}$ and the ignition delay time $T_d$ would not. The invention is therefore directed to the adjustment of the discharge off-time $T_{off}$ and the ignition delay time $T_d$ to enhance the working efficiency of the electric discharging machine. Preferred embodiments are disclosed in the following.

Figure 1:
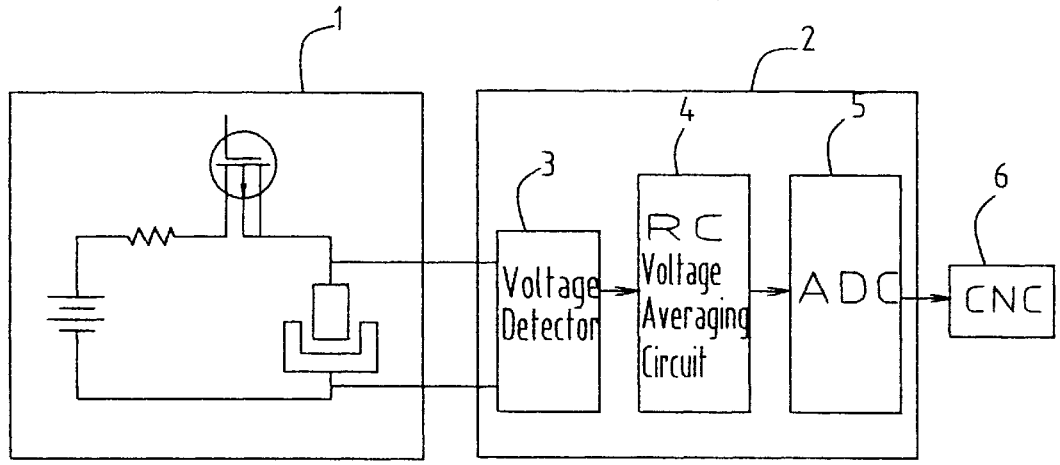
FIG. 1 is a schematic block diagram of an electric discharging machine that utilizes a conventional servo feedrate control method.
Figure 2:
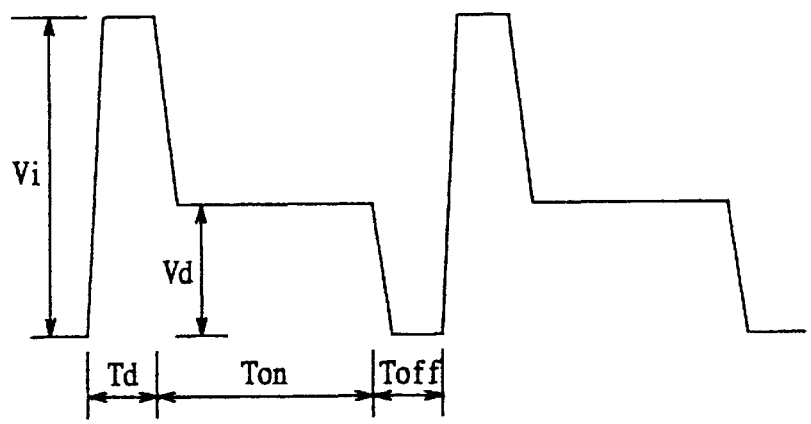
FIG. 2 is a schematic diagram showing the various waveforms of the voltage drop between the electrode and the workpiece during each discharge in the electric discharging machine of FIG. 1.
Figure 3:
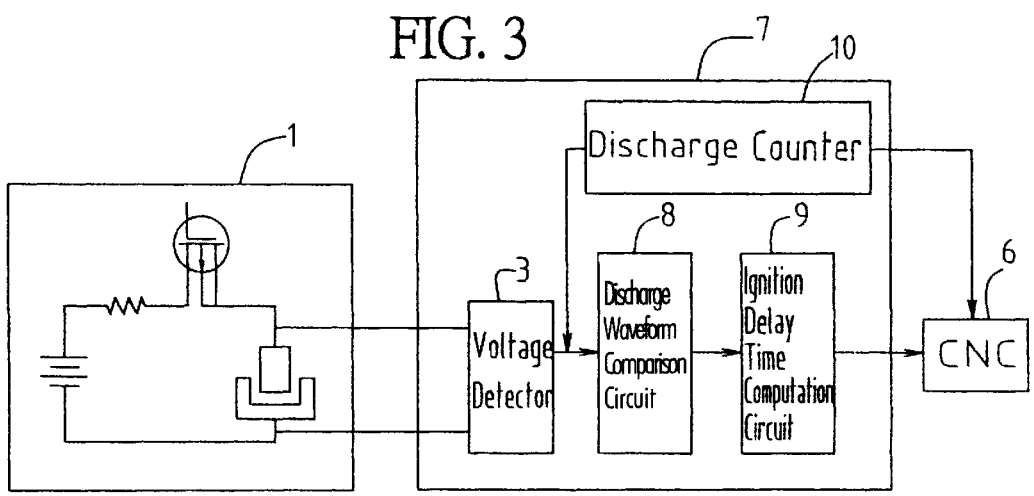
FIG. 3 is a schematic block diagram of an electric discharging machine that utilizes the apparatus and method of the invention to enhance the working efficiency of the electric discharging machine.

FIG. 3 is a schematic block diagram of an electric discharging machine that utilizes the method and apparatus of the invention. As shown, the method and apparatus of the invention includes an ignition delay time detection circuit 7 coupled between the discharging circuit 1 and the CNC unit 6. In more detail, the ignition delay time detection circuit 7 is composed of a voltage detector 3, a discharge waveform comparison circuit 8, an ignition delay time computation circuit 9, and a discharge counter 10.

The voltage detector 3 is used to detect the current voltage drop between the electrode and the workpiece in the discharging circuit 1. The output of the voltage detector 3 is then transferred to both the discharge waveform comparison circuit 8 and the discharge counter 10. At the discharge waveform comparison circuit 8, the output of the voltage detector 3 is compared with a preset reference voltage to determine whether the currently detected voltage is an ignition voltage. The output of the discharge waveform comparison circuit 8 is then transferred to the ignition delay time computation circuit 9 to activate the ignition delay time computation circuit 9 to measure the length of the ignition delay time (i.e., $T_d$). Meanwhile, the discharge counter 10 counts the number of ignition discharges. Based on the output of the discharge counter 10 and the output of the ignition delay time computation circuit 9, the CNC unit 6 computes the average ignition delay time and then adjusts the ignition delay time of the subsequent discharges to within this range. The average ignition delay time is obtained by dividing the total ignition delay time of a series of discharges by the total number of these discharges.

As a result, in the event that the ignition delay time is overly long (which can degrade the working efficiency of the electric discharging machine) or overly short (which can increase the chances of arcing, leading to the undesired consequence of carbon accumulation), the overly long or short ignition delay time can be adjusted to within the preset range by the CNC unit so as to maintain the duty factor near the desired value. In this preferred embodiment, the ignition delay time is controlled to within 15 µs.

Figure 4:
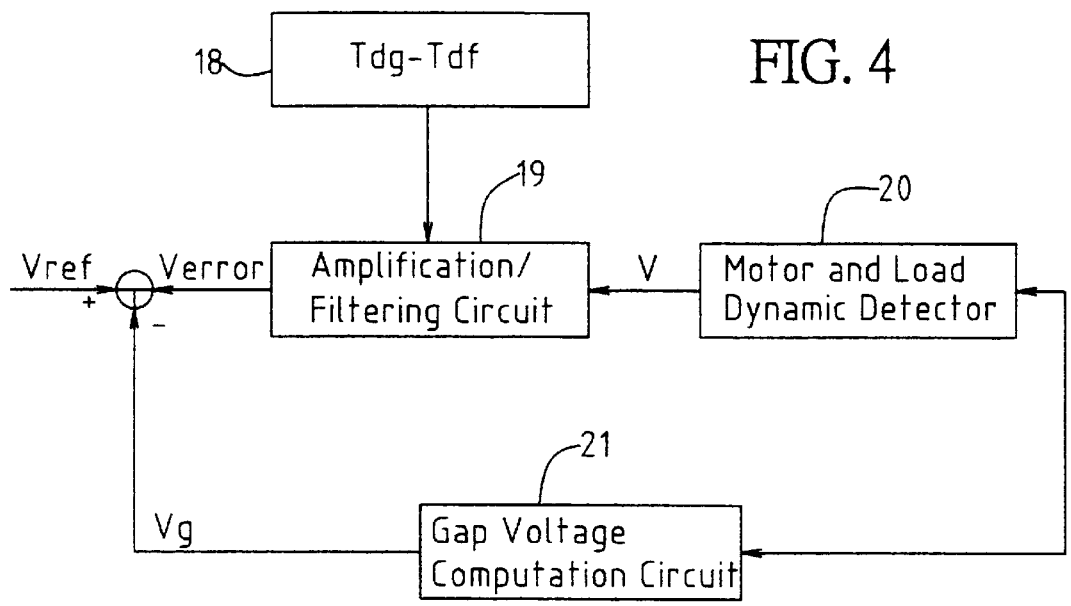
FIG. 4 is a schematic diagram used to depict how the ignition delay time can be used to adjust the sensitivity of the servo control of the electric discharging machine.

FIG. 4 is a schematic diagram of a servo-sensitivity adjustment circuit that can adjust the sensitivity of the servo control based on the ignition delay time. As shown, the servo-sensitivity adjustment circuit includes a feedback loop composed of an ignition delay time difference computation circuit 18, an amplification/filtering circuit 19, a motor and load dynamic detector 20, and a gap voltage computation circuit 21. In operation, the desired gap voltage is set as a reference voltage $V_{ref}$, which is compared with the actual gap voltage $V_g$. If not equal, an error signal $V_{error}$ be generated. The computation circuit 18 is used to compare the desired ignition delay time $T_{df}$, which is typically set at 15 µs, with the actual one $T_{dg}$ to thereby generate a difference signal $T_{dg}-T_{df}$. The difference signal $T_{dg}-T_{df}$ from the computation circuit 18 and the error signal $V_{error}$ are then both preprocessed by the amplification/filtering circuit 19. The amplification ratio is g. The output of the amplification/filtering circuit 19 is then used to control the feedrate V of the electric discharging machine in accordance with the following equation:

$$V=V_{error}*|T_{dg}-T_{df}|*g$$

During operation of the electric discharging machine, various conditions can occur that would affect the machining process. For instance, when the discharging gap between the electrode and the workpiece is increased, the discharging will be less likely to occur, thus causing an increase in the ignition delay time that will degrade machining efficiency. One solution to this problem is to install a high-voltage ignition circuit in the electric discharging machine so as to help ignite the discharge voltage by means of a high voltage.

Figure 5:
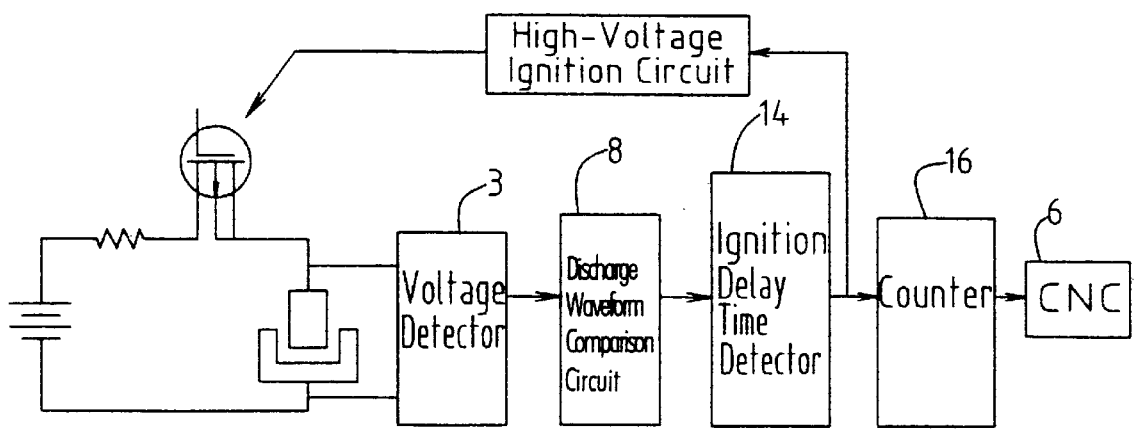
FIG. 5 is a schematic diagram of the electric discharging machine utilizing the apparatus and method of the invention to handle the condition of an overly long ignition delay time.

FIG. 5 is a schematic diagram of the electric discharging machine utilizing the apparatus and method of the invention to handle the condition of an overly long ignition delay time (i.e., the condition where the ignition of discharge voltage is difficult). As shown, the voltage drop across the electrode and the workpiece is first detected by the voltage detector 3 and then compared by the discharge waveform comparison circuit 8 to determine whether the currently detected voltage is an ignition voltage, and if yes, the ignition delay time detector 11 is then activated to detect the ignition delay time of the ignition voltage. If it exceeds the desired value, the ignition delay time detector 11 outputs a trigger signal to the high-voltage ignition circuit 12, thereby causing the high-voltage ignition circuit 12 to output a high voltage to assist ignition. Moreover, the number of ignitions is counted by the counter 13 and serves as a reference for the CNC unit 6 in controlling the next feedrate.

In the case when the discharging gap is too small, if the ignition delay time is overly short, the discharge off-time $T_{off}$ can be increased so as to allow enough time for residue cleaning, cooling, and restoration of insulation. While the duty factor increases with a decrease in the ignition delay time, which enhances efficient discharging, the control for this, is difficult to achieve. If energy is overly concentrated at one point during the discharging, it would cause carbon accumulation that makes the discharging even more difficult to occur. Therefore, most preferably, the desired ignition delay time is set at 15 µs instead of at 0 so as to obtain the optimal value for the duty factor.

Figure 6:
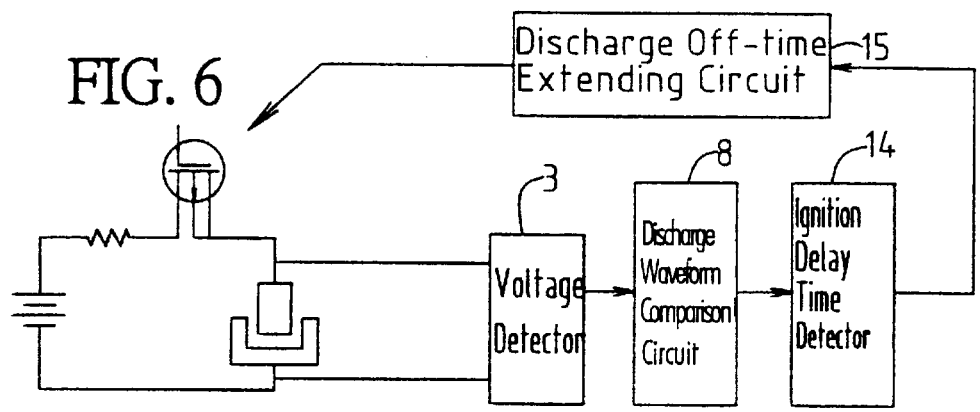
FIG. 6 is a schematic diagram of the electric discharging machine utilizing the apparatus and method of the invention to handle the condition of an overly short ignition delay time.

FIG. 6 is a schematic diagram of the electric discharging machine utilizing the apparatus and method of the invention to handle the condition of an overly short ignition delay time. As shown, the voltage drop across the electrode and the workpiece is first detected by the voltage detector 3 and then compared by the discharge waveforn comparison circuit 8 to determine whether the currently detected voltage is an ignition voltage, and, if yes, the ignition delay time detector 14 is then activated to detect the ignition delay time of the ignition voltage. If overly low compared to the desired value, the ignition delay time detector 14 outputs a trigger signal to a discharge off-time extending circuit 15, thereby causing the discharge off-time extending circuit 15 to extend the discharge off-time. This prevents the above-mentioned problems due to energy concentration of the discharging that arises from an overly short ignition delay time.

During the operation of the electric discharging machine, the residue cleaning is another important factor that would affect the discharging efficiency. The residue cleaning process is performed for the purpose of cleaning away the carbon residues resulting from the electric discharging on the workpiece. A large amount of carbon residues would adversely affect discharging, leading to the occurrence of undesired arcing. One solution proposed by the invention is disclosed in the following.

Figure 7:
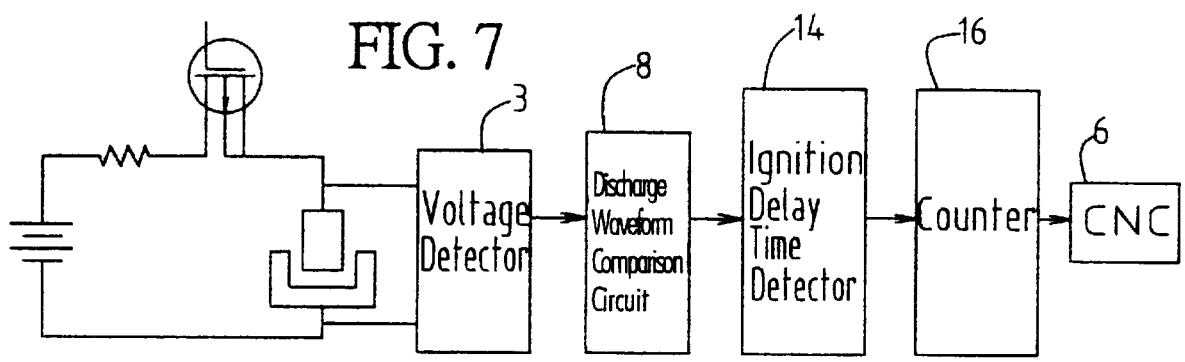
FIG. 7 is a schematic diagram of the electric discharging machine utilizing the apparatus and method of the invention to handle the condition of arcing.

FIG. 7 is a schematic diagram of the electric discharging machine utilizing the apparatus and method of the invention to handle the condition of arcing. As show the voltage drop across the electrode and the workpiece is first detected by the voltage detector 3 and then compared by the discharge waveform comparison circuit 8 to determine whether the currently detected voltage is an ignition voltage. If the currently detected voltage is an ignition voltage, the ignition delay time detector 14 is then activated to detect its ignition delay time. If it is overly low compared to the desired value, the ignition delay time detector 14 outputs a trigger signal to the counter 16 causing the counter 16 to count the number of arcing occurrences. If it reaches a preset number, the counter 16 outputs a trigger signal to the CNC unit 6 to cause the CNC unit 6 to perform a residue cleaning process.

An undesired result from an overly short ignition delay time is a short-circuit. When a short-circuit occurs, the ignition voltage and the discharge voltage will be both low, resulting in degrading the discharge that would affect the surface quality of the workpiece. Should this happen, the CNC unit will withdraw the workpiece immediately from a working position.

Figure 8:
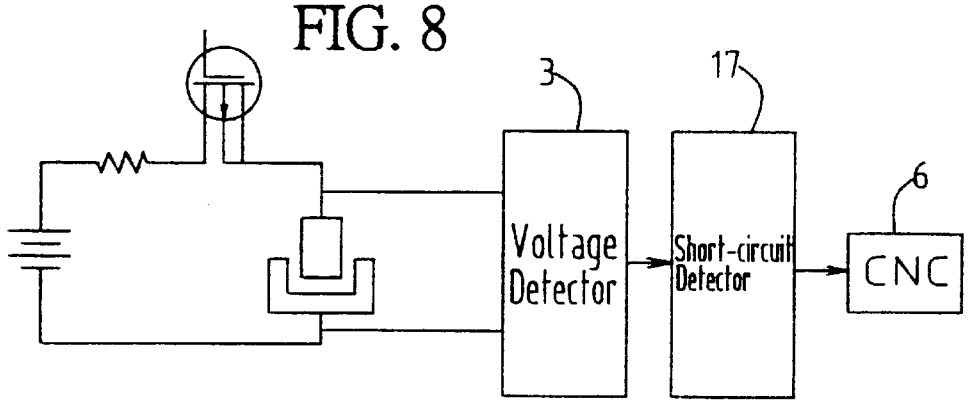
FIG. 8 is a schematic diagram of the electric discharging machine utilizing the apparatus and method of the invention to handle the condition of a short-circuit.

FIG. 8 is a schematic diagram of the electric discharging machine utilizing the apparatus and method of the invention to handle the condition of a short-circuit. As shown, the voltage drop across the electrode and the workpiece is first detected by the voltage detector 3. When a short-circuit occurs, the detected voltage will be extremely low. This extremely low voltage will be detected by the short-circuit detector 17. If there is a short-circuit, the short-circuit detector 17 will output a trigger signal to the CNC unit 6 causing the CNC unit 6 to withdraw the workpiece immediately from a working position.

In conclusion, the invention allows an increase in the duty factor and can handle various adverse conditions to improve the discharging efficiency and output of the electric discharging machine. The invention therefore has high utilization value for electric discharging machines.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for using an electric discharging machine comprising the steps of:
   (1) detecting an average discharge voltage of a series of discharges;
   (2) determining an average ignition delay time of the series of discharges to accordingly adjust a gain of a servo control loop of the electric discharging machine;
   (3) detecting an ignition delay time to accordingly adjust a magnitude of an ignition voltage and a length of a discharge off-time;
   (4) detecting whether a number of consecutive occurrences of arcing reaches a preset number, and, if the preset number is reached, performing a residue cleaning process; and
   (5) detecting whether a short-circuit occurs, and, if a short-circuit does occur, stopping the electric discharging machine immediately.

2. The method of claim 1, wherein in said step (2), the average ignition delay time is obtained by dividing a total ignition delay time of the series of discharges by a total number of the discharges in the series to accordingly control the ignition delay time of subsequent discharges.

3. The method of claim 1, wherein said step (3) includes at least one of the substeps of:
   determining if the ignition delay time is greater than a first preset reference value and no discharges occur, and if so, applying a high voltage to assist in ignition; and
   determining if the ignition delay time is less than a second preset reference value, and if so, extending the discharge off-time.

4. The method of claim 1, wherein said step (4) includes the following substep:
   detecting the ignition delay time of each of the occurrences of arcing, and, if the delay time is less than a preset reference value, adding one to a counter; and if the counter reaches a preset value, actuating a computer numerical control unit to perform the residue cleaning process.

5. The method of claim 1, wherein said step (5) includes the following substep:
   detecting whether the discharge voltage is lower than a preset short-circuit value during any time other than the discharge off-time, and, if so, actuating a computer numerical control unit to stop the electric discharging machine immediately.

6. The method of claim 1, wherein said step (3) includes the substep of:
   determining if the ignition delay time is greater than a first preset reference value and no discharges occur, and if so, applying a high voltage to assist in ignition.

7. The method of claim 6, wherein said step (3) includes the substep of:
   determining if the ignition delay time is less than a second preset reference value, and if so, extending the discharge off-time.

8. The method of claim 1, wherein said step (3) includes the substep of:
   determining if the ignition delay time is less than a preset reference value, and if so, extending the discharge off-time.

9. An apparatus for use on an electric discharging machine to enhance a discharging efficiency of the electric discharging machine, which comprises:
   a voltage detector for detecting a voltage drop between a workpiece and an electrode of the electric discharging machine;
   a discharge waveform comparison circuit that, in response to an output of the voltage detector, checks whether the voltage detected by the voltage detector is an ignition voltage;
   an ignition delay time computation circuit that, in the event that the discharge waveform comparison circuit determines that the voltage detected by the voltage detector is an ignition voltage, detects a length of an ignition delay time of the ignition voltage;
   a discharge counter that, in response to an output of the voltage detector, counts a number of occurrences of discharges; and
   a computer numerical control unit that, in response to an output of the ignition delay time computation circuit and an output of the discharge counter, determines an average ignition delay time obtained by dividing a total ignition delay time of a series of discharges by a total number of the discharges in the series and adjusts a gain of a servo control loop of the electric discharge machine according to the average ignition delay time, and thereby accordingly controls the ignition delay time of subsequent discharges.

10. The apparatus of claim 9, further comprising:
    an ignition delay time detector for detecting whether the ignition delay time is less than a preset reference value, and, if so, generating a trigger signal; and
    a counter that, in response to the trigger signal generated by the ignition delay time detector, counts a number of consecutive occurrences of arcing, and, if a preset number of consecutive occurrences of arcing occurs, the counter generates an actuating signal to actuate the computer numerical control unit to perform the residue cleaning process.

11. The apparatus of claim 9, further comprising:
    a short-circuit detector, coupled to an output of the voltage detector, for detecting whether the voltage detected by the voltage detector is below a preset short-circuit value, and, if so, generating an actuating signal to actuate the computer numerical control unit to withdraw the workpiece immediately from a working position.

12. The apparatus of claim 9, further comprising:
an ignition delay time detector for detecting whether the ignition delay time is greater than a preset reference value, and, if so generating a trigger signal; and
a high-voltage ignition circuit that, in response to the trigger signal generated by the ignition delay time detector, applies a high voltage to assist in ignition.

13. The apparatus of claim 12, further comprising:
a counter, coupled to the ignition delay time detector, for counting a number of occurrences of discharges, which is used by the computer numerical control unit to set a next feedrate.

14. The apparatus of claim 9, further comprising:
an ignition delay time detector for detecting whether the ignition delay time is less than a preset reference value, and, if so, generating a trigger signal; and
a discharge off-time extending circuit that, in response to the trigger signal generated by the ignition delay time detector, extends the discharge off-time.

* * * * *